United States Patent [19]

Ledley

[11] Patent Number: 5,296,846

[45] Date of Patent: Mar. 22, 1994

[54] THREE-DIMENSIONAL CURSOR CONTROL DEVICE

[75] Inventor: Robert S. Ledley, Silver Spring, Md.

[73] Assignee: National Biomedical Research Foundation, Washington, D.C.

[21] Appl. No.: 957,462

[22] Filed: Oct. 5, 1992

Related U.S. Application Data

[63] Continuation of Ser. No. 597,843, Oct. 15, 1990, abandoned.

[51] Int. Cl.$^5$ ............................................. G09G 3/02
[52] U.S. Cl. .................................................. 345/161
[58] Field of Search ...................... 340/709, 706, 710; 74/471 XY, 471 R; 200/6 A; 273/148 B; 434/45

[56] References Cited

U.S. PATENT DOCUMENTS

| | | | |
|---|---|---|---|
| 3,613,501 | 10/1971 | Sanders | 409/84 |
| 4,214,267 | 7/1980 | Roese et al. | 358/111 |
| 4,369,439 | 1/1983 | Broos | 340/706 |
| 4,524,348 | 6/1985 | Leftkwitz | 340/706 |
| 4,555,960 | 12/1985 | King | 74/471 XY |
| 4,607,255 | 8/1986 | Fuchs et al. | 340/755 |
| 4,685,070 | 8/1987 | Flinchbaugh | 340/747 |
| 4,731,530 | 3/1988 | Mikan | 340/709 |
| 4,748,441 | 5/1988 | Brzezinski | 340/709 |
| 4,766,423 | 8/1988 | Ono et al. | 340/709 |
| 4,791,478 | 12/1988 | Tredwell et al. | 358/88 |
| 4,812,829 | 3/1989 | Ebina et al. | 340/709 |
| 4,823,170 | 4/1989 | Hansen | 356/375 |
| 4,835,528 | 5/1989 | Flinchbaugh | 340/709 |
| 4,839,838 | 6/1989 | LaBiche et al. | 364/709.11 |
| 4,840,567 | 6/1989 | Litt | 434/114 |
| 4,879,556 | 11/1989 | Duimel | 340/709 |
| 4,933,670 | 6/1990 | Wislocki | 340/709 |

*Primary Examiner*—Alvin E. Oberley
*Assistant Examiner*—Xiao M. Wu
*Attorney, Agent, or Firm*—Joseph G. Seeber

[57] ABSTRACT

A cursor control device for use with a three-dimensional stereoscopic image display system comprises a housing defining a volume corresponding to a displayed three-dimensional volume, and a joystick operable by the user for moving and positioning a cursor in the displayed three-dimensional volume. The joystick has a knob which is movable within the volume defined by the housing so as to designate desired positioning and movement of the cursor within the displayed three-dimensional volume. There is, at any given time, both positional and movement congruency between the position and movement of the knob and position and movement, respectively, of the cursor.

13 Claims, 5 Drawing Sheets

THREE-DIMENSIONAL CURSOR CONTROL DEVICE

This application is a continuation of application Ser. No. 07/597,843, filed Oct. 15, 1990, now abandoned.

TECHNICAL FIELD

The present invention generally relates to a three-dimensional cursor control device, and more particularly to a device operable by a user of a three-dimensional stereoscopic image system for controlling the position and movement of a cursor displayed in conjunction with the three-dimensional stereoscopic image.

BACKGROUND ART

With the development of computer systems in general, and with the development of personal computers and workstations in particular, various devices for controlling the position and movement of a cursor on the two-dimensional display provided by a computer display unit have been developed. Typical of such devices are the "mouse" device, the joystick device, and the like.

Recently, systems for displaying a three-dimensional stereoscopic image of an object on a display unit have been developed. Such systems provide for the display of a cursor which, when viewed as a part of the three-dimensional stereoscopic display (by the use of special glasses, for example), identify a point in three-dimensional space.

However, no device (or, at least, no easily usable device) has been developed for operator manipulation of the cursor in such a three-dimensional stereoscopic display. Thus, there is a need for a three-dimensional cursor control device which permits the operator to conveniently and accurately control the movement and position of the cursor in three-dimensional space.

Such a three-dimensional cursor control device should be "user friendly". That is to say, there should be positional congruency between manipulation of the device by the user and the positioning of the cursor in three-dimensional space. In addition, there should be movement congruency between manipulation of the device by the user and movement of the cursor in three-dimensional space.

The following patents are considered to be typical of the prior art relative to the invention disclosed herein: U.S. Pat. Nos. 3,613,501; 4,214,267; 4,607,255; 4,685,070; 4,766,423; 4,791,478; 4,812,829; 4,823,170; 4,835,528; 4,839,838; and 4,840,567.

DISCLOSURE OF INVENTION

The present invention generally relates to a three-dimensional cursor control device. More particularly, the invention relates to a cursor control device for use with a three-dimensional stereoscopic image display system.

In general, the cursor control device of the present invention comprises a housing defining a volume corresponding to the three-dimensional volume displayed by the stereoscopic image system, and the device further comprises a specially designed joystick arrangement having a knob located within the volume defined by the housing.

The position of the knob within the volume defined by the housing corresponds to the position of the cursor in the three-dimensional volume displayed on the stereoscopic image display unit. Moreover, movement of the knob to the left and right, upward and downward, or forward and backward corresponds to movement of the cursor in the volume displayed on the stereoscopic image display unit. Accordingly, both positional congruency and movement congruency are achieved by the device of the present invention.

The cursor control device of the present invention employs a guide assembly on which the joystick is mounted, the guide assembly including two angle potentiometers responsive to left, right, upward and downward movement of the joystick for providing corresponding electrical signals indicative of the positioning and movement of the knob in two dimensions within the volume defined by the housing. In addition, the guide assembly is mounted on a platform which, in turn, is slidably mounted on a base, and a third potentiometer arrangement is connected to the sliding platform so as to generate an electrical signal corresponding to forward and backward movement of the platform, and thus forward and backward movement of the knob of the joystick, this latter electrical signal corresponding to the third dimension in the volume defined by the housing.

An interface processes the electrical signals from the potentiometer, converting them to digital form, and a processor uses the digital data to perform a series of conversions, resulting in proper positioning and movement of the cursor within the three-dimensional volume displayed by the stereoscopic image display unit.

Therefore, it is a primary object of the present invention to provide a three-dimensional cursor control device.

It is an additional object of the present invention to provide a cursor control device for use with a three-dimensional stereoscopic image display system.

It is an additional object of the present invention to provide a cursor control device having a housing defining a volume corresponding to the displayed three-dimensional volume.

It is an additional object of the present invention to provide a cursor control device having a joystick knob located within the volume defined by the housing.

It is an additional object of the present invention to provide a cursor control device which achieves both positional congruency and movement congruency between the position and movement, respectively, of the joystick knob and the position and movement, respectively, of the cursor within the displayed three-dimensional volume.

The above and other objects, as will hereinafter appear, and the nature of the invention will be more fully understood by reference to the following detailed description, the accompanying drawings, and the appended claims.

BEST MODE FOR PRACTICING THE INVENTION

The invention will now be described in more detail with reference to the figures.

Figure 1:
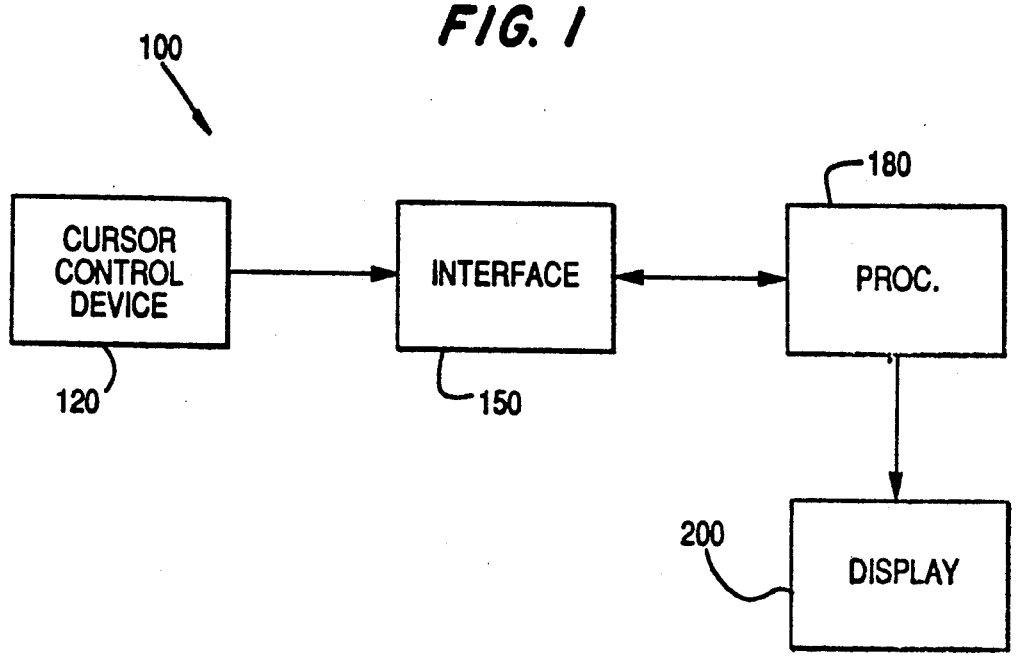
FIG. 1 is a block diagram of a three-dimensional stereoscopic image display system employing the cursor control device of the present invention.

FIG. 1 is a block diagram of a three-dimensional stereoscopic image display system employing the cursor control device of the present invention. As seen therein, the system 100 comprises a cursor control device 120, interface 150, processor 80, and display unit 200.

In operation, the cursor control device 120 functions in a manner to be described in more detail below to generate three analog electrical signals corresponding to movement of a cursor control knob of the device 120 leftward and rightward, upward and downward, and forward and backward, respectively.

As described below with reference to FIG. 6, the interface 150 basically converts the analog signals from cursor control device 120 to digital form, and provides the resultant digital data to processor 180.

As described in more detail below with reference to FIG. 7, the processor 180 processes the digital data from interface 150 to develop left image data and right image data appropriate for a three-dimensional stereoscopic image display. The data developed by processor 180 are provided to display unit 200, which displays the three-dimensional stereoscopic image of the object together with a cursor positioned in the displayed three-dimensional volume in a manner consistent with the positioning of the control knob of cursor control device 120, as manipulated by the user of the device.

Processor 180 and display unit 200 can be any conventional processor and display unit, respectively, capable of processing three-dimensional stereoscopic image data and displaying a three-dimensional stereoscopic image of an object, respectively.

Figure 2:
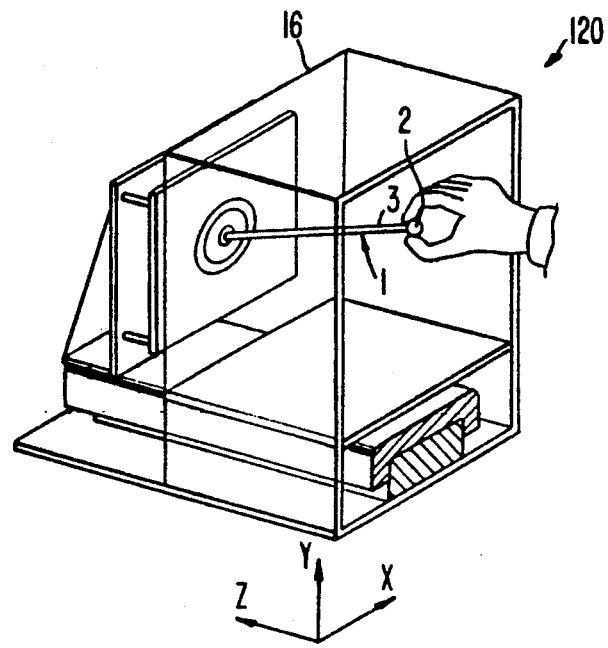
FIG. 2 is a perspective view of the cursor control device of the present invention.
Figure 3:
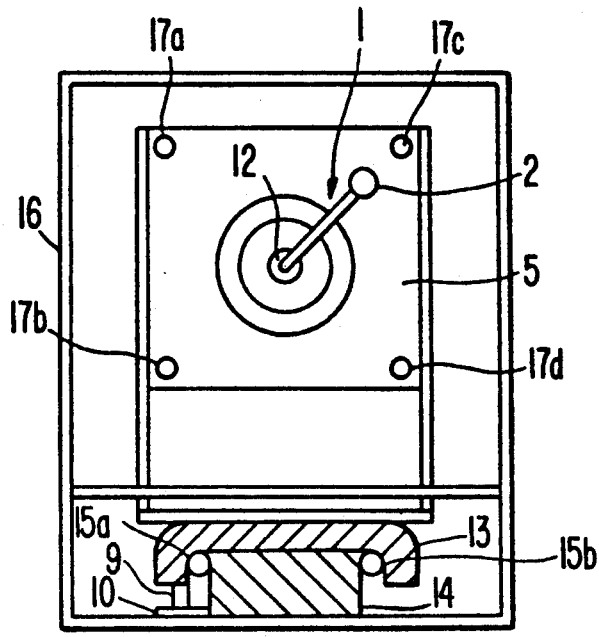
FIG. 3 is a front view of the cursor control device of FIG. 2.
Figure 4:
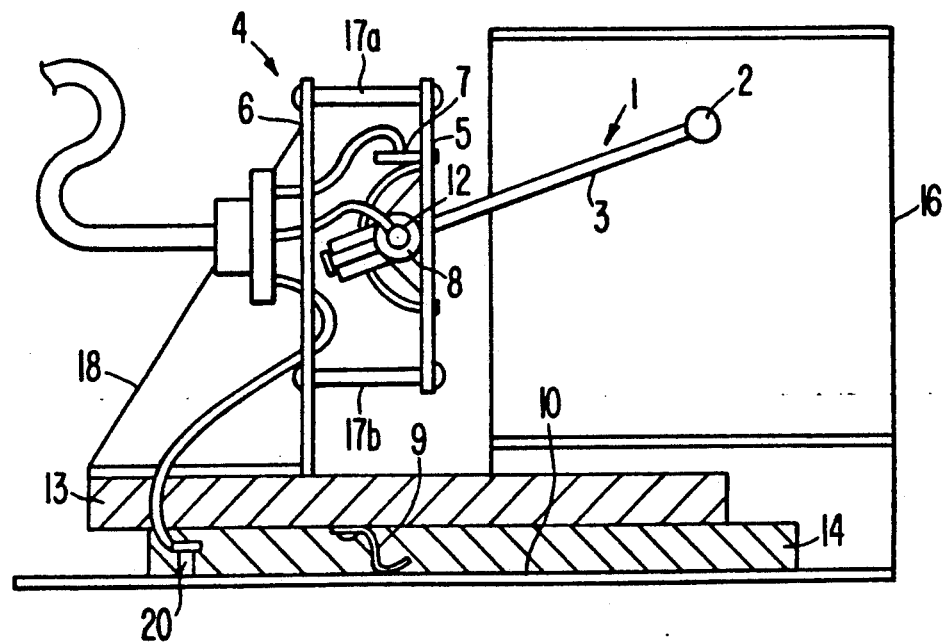
FIG. 4 is a side view of the cursor control device of FIG. 2.

FIG. 2 is a perspective view of the cursor control device of FIG. 1, FIG. 3 is a front view of the cursor control device of FIG. 1, and FIG. 4 is a side view of the cursor control device of FIG. 1.

As seen therein, cursor control device 120 comprises a plastic, transparent, cube-like housing 16 in which a joystick-type device 1 is positioned. More specifically, the joystick 1 comprises a shaft 3, at one end of which a knob 2 is located, the other end of shaft 3 being connected to a universal joint 12. The universal joint 12 enables the knob 2 to be moved in any direction in the X-Y plane (see the reference axes in FIG. 2). Moreover, as described below, the knob 2 can be moved forward and backward along the Z-axis as well.

Figure 5:
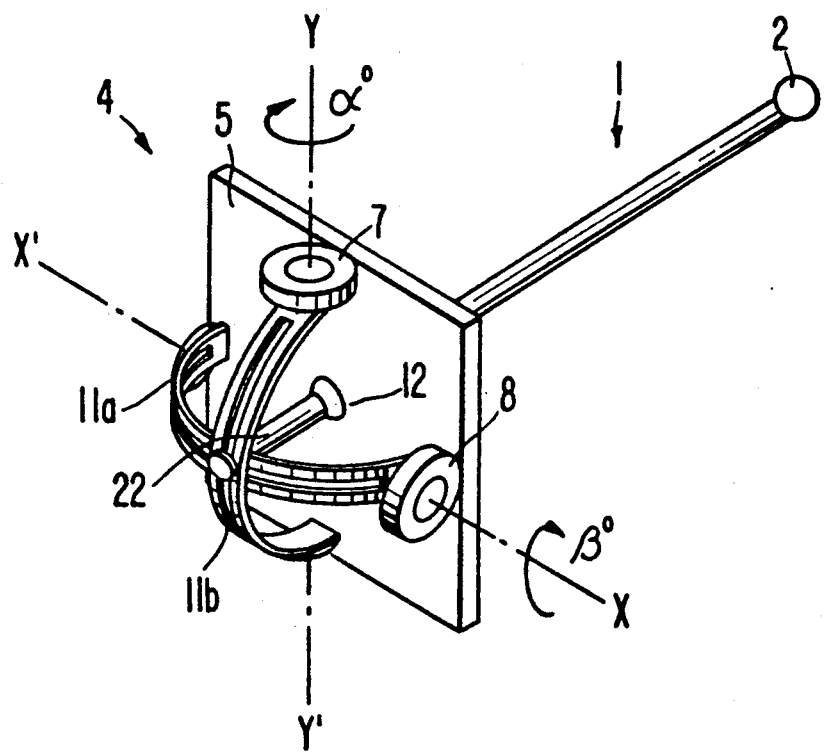
FIG. 5 is a perspective view of the guide assembly employed by the cursor control device of the present invention.

Further referring to FIGS. 3 and 4, the joystick 1 is mounted via universal joint 12 on a guide assembly 4. The guide assembly 4 comprises a front plate 5 and a rear plate 6 connected and separated by standoff elements 17a-17d. As seen in FIG. 4, and as seen in somewhat more detail in the enlarged perspective view of the guide assembly in FIG. 5, angle guides 11a and 11b are orthogonally positioned on the rear side of plate 5, and corresponding angle potentiometers 7 and 8 are positioned at an end of angle guides 11a and 11b, respectively. A wiper arm 22 extends from the universal joint 12 to and through angle guide 11a and angle guide 11b.

In operation, movement of the knob 2 in the X-Y plane (FIG. 2) results in rotation of the shaft 1 and wiper blade 22 (FIG. 5) about universal joint 12, located at the junction of the X-X' and Y-Y' axes. As a result, wiper arm 22 rotates through an angle $\alpha$ relative to the axis Y-Y' and an angle B relative to the axis X-X'. Operating in a conventional manner, angle potentiometers 7 and 8 generate electrical signals corresponding to the angular displacement of wiper arm 22, and thus shaft 3, relative to a base position. In this particular embodiment, movement of the knob 2 completely to the left results in generation of zero volts, while movement of knob 2 completely to the right results in a maximum voltage. Similarly, movement of knob 2 completely upward results in zero volts, while movement of knob 2 completely downward results in a maximum voltage.

Further referring to FIGS. 3 and 4, rear plate 6 of the angle guide assembly 4 is positioned on the top of an actuator arrangement, and more specifically on an upper platform 13, the rear plate 6 being supported by a bracket 18. Upper platform 13 is, in turn, mounted on an actuator bottom defined by lower platform or base 14, and bearings 15a and 15b are disposed between upper platform 13 and base 14 so that a sliding relationship exists between those two elements. Thus, in operation, if the user pushes on knob 2, rearward movement of the knob 2 results since the platform 13 slides to the rear on base 14. Similarly, pulling on knob 2 results in forward movement of the knob 2 as a result of forward sliding of platform 13 on base 14.

A resistance strip 10 is positioned below a side portion of the platform 13, and a potentiometer slider 9 extends from the side portion of platform 13 to the resistance strip 10. The potentiometer 20 is positioned at the rear of resistance strip 10. As a result, potentiometer 20 generates zero volts when the joystick 1, guide assembly 4 and platform 13 are moved completely to the rear, while potentiometer 20 generates a maximum voltage when the joystick 1, guide assembly 4 and platform 13 are moved completely to the front.

Figure 6:
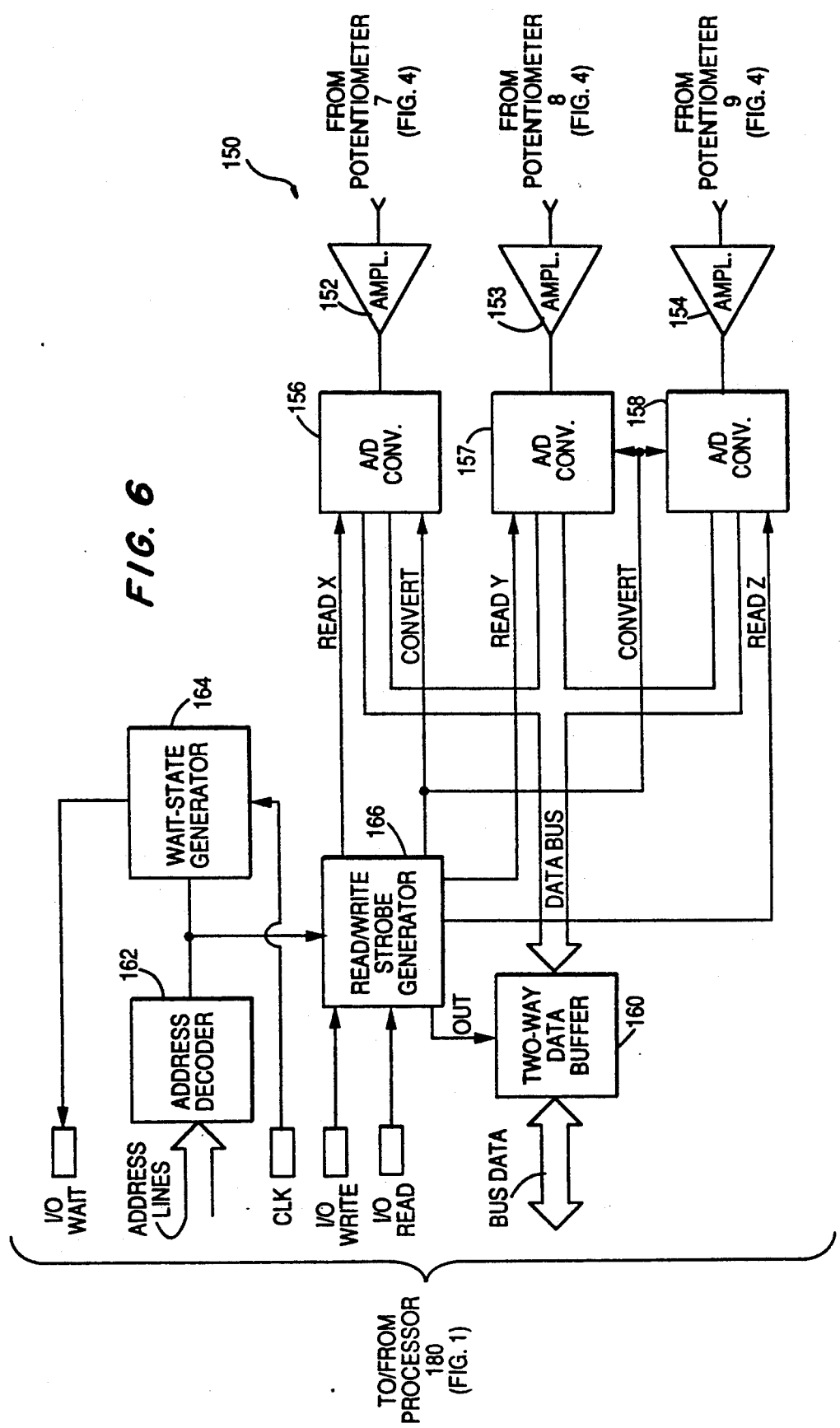
FIG. 6 is a block diagram of the interface of FIG. 1.

FIG. 6 is a block diagram of the interface of FIG. 1. As seen therein, interface 150 comprises amplifiers 152-154, analog-to-digital converters 156-158, two-way data buffer 160, address decoder 162, wait-state generator 164 and read/write strobe generator 166.

In operation, the electrical signals from potentiometers 7-9 of FIG. 4 are voltage-amplified in amplifiers 152-154, respectively, and the resultant amplifier outputs are presented at the input of converters 156-158, respectively.

Further referring to FIG. 6, address decoder 162 receives address information from processor 180, decodes that information, and thus determines when the processor 180 has chosen the cursor control device 120 for the input of information by cursor control device 120 into processor 180. When decoder 162 determines that the device 120 has been selected by processor 180, a brief "wait state" is established by the provision of an I/O WAIT control input to processor 180 from wait-state generator 164, the latter being driven by a clock input (CLK) from processor 180. The establishment of such a "wait state" is useful if data is being transferred to the interface 150 when the processor 180 selects the interface 150. Finally, decoder 162 activates read/write strobe generator 166 so that generator 166 commences control of the transfer of information from potentiometer 7, 8 and 9 of cursor control device 120 thru interface 150 to processor 180.

More specifically, in response to an I/O READ control input from processor 180, generator 166 transmits control signals READ X, READ Y and READ Z to the converters 156–158, respectively, and each converter responds to its respective "read" control input by sampling the analog input from its respective amplifier. Each converter 156–158 then converts the analog input to digital form in response to a CONVERT command from generator 166.

The resultant digital data are provided via a common data bus to data buffer 160. Data buffer 160 responds to an OUT control input from generator 166, the latter being in response to a control input I/O WRITE from processor 180, by sending the digital data via a conventional data bus to the processor 180.

The operation of the interface 150 of FIG. 6 will be further described with reference to the flowchart of FIG. 7, which describes the control operations of the processor 180 of FIG. 1.

Figure 7:
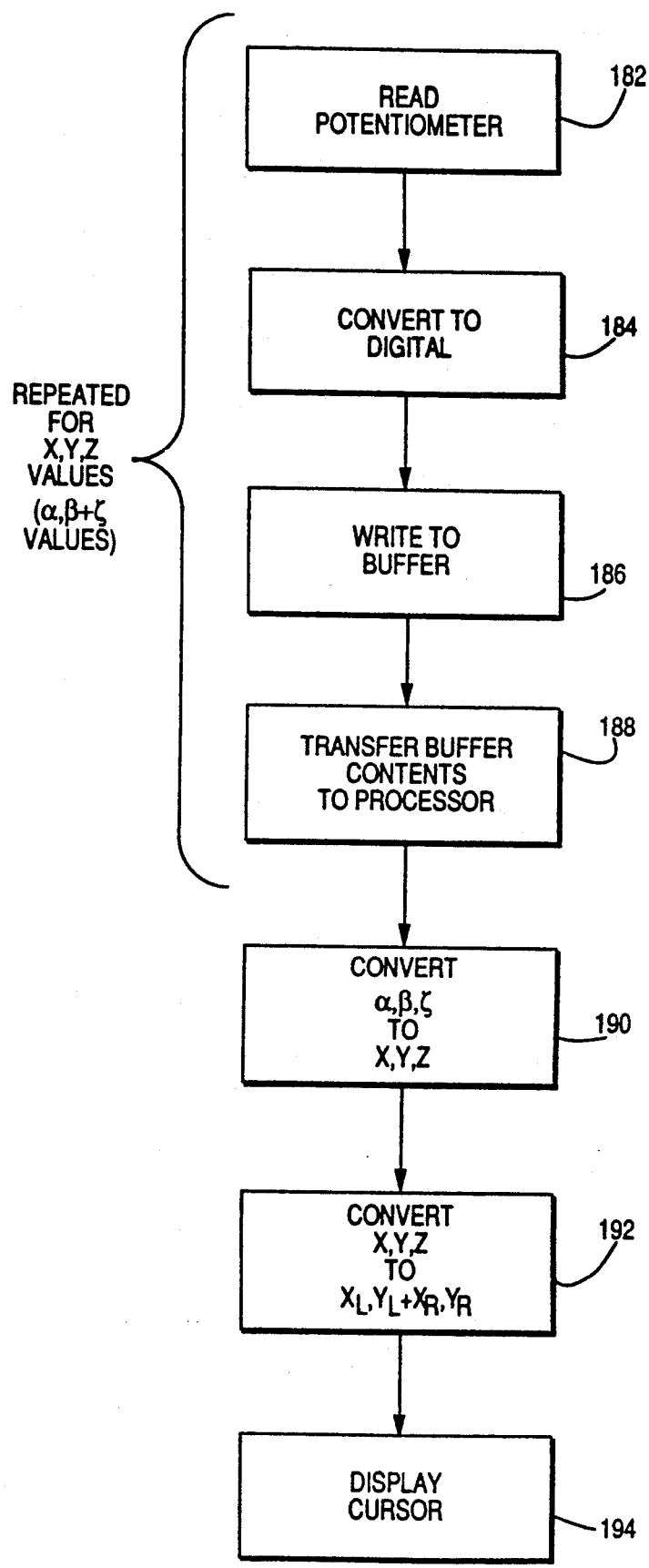
FIG. 7 is a flowchart of the software operations performed by the processor of FIG. 1.

Referring to FIGS. 6 and 7, as mentioned above, in response to the I/O READ control input from processor 180, strobe generator 166 directs converter 156 to read the analog output of potentiometer 152 (the α value), and then generator 166 directs converter 156 to perform a digital conversion (see blocks 182 and 184 of FIG. 7). The digital value from converter 156 is provided via a data bus to the two-way data buffer 160. In response to the I/O WRITE control input from processor 180, generator 166 directs the buffer 160 to provide its data as an output on the processor bus to processor 180 (see blocks 186 and 188 of FIG. 7).

The latter procedure is repeated for potentiometer 8 (the β value) and for potentiometer 9 (the Z value), until processor 180 is provided with a full set of data for the position of the cursor.

Processor 180 then performs a conversion of the α, β and Z values to X, Y and Z coordinates in accordance with conventional equations (see block 190 of FIG. 7), as follows:

$$X = J \sin \alpha \cos \beta + \frac{J}{2}$$

$$Y = J \sin \beta + \frac{J}{2}$$

$$Z = Z_0 - J \cos \beta \cos \alpha + J$$

where J defines the radial distance from the origin of a Cartesian coordinate system to the position of the cursor in three-dimensional space, and where $Z_0$ is the Z value prior to conversion.

Then, the processor 180 performs a conversion from X, Y and Z coordinates to stereo pair coordinates in two dimensions (see block 192 of FIG. 7) in accordance with conventional equations, as follows:

$$L_X = \frac{Xf}{Z}, \quad L_Y = \frac{Yf}{Z}$$

$$R_X = d + \frac{f(X-d)}{Z}, \quad R_Y = \frac{Yf}{Z}$$

where f and d are dimensional constants of the three-dimensional volume.

Once the stereo pair coordinates are determined, processor 180 provides the coordinate data and any other appropriate display data to display unit 200, causing the latter to display the cursor at two points on the display unit corresponding to the left and right stereo pair of points. The user, by using stereo glasses to view the display unit 200, sees the cursor as a single point located at the appropriate position in three-dimensional space (see block 194 of FIG. 7).

While preferred forms and arrangements have been shown in illustrating the invention, it is to be understood that various changes in detail and arrangement may be made without departing from the spirit and scope of this disclosure.

I claim:

1. In a system for displaying a three-dimensional stereoscopic image of an object positioned in a displayed three-dimensional volume;

a cursor control device comprising a housing defining a volume corresponding to the displayed three-dimensional volume, said device further comprising joystick means operable by the suer for moving the positioning a cursor in the displayed three-dimensional volume, wherein said joystick means includes a knob which is movable from one position to another within the volume defined by said housing;

said joystick means further comprising a base portion, an upper portion mounted on said base portion, and a shaft having a first end connected to said upper portion and a second end, said knob being positioned on said second end of said shaft;

said device further comprising potentiometer means responsive to movement of said upper portion relative to said base portion for generating an electrical signal corresponding thereto, said potentiometer means comprising a resistance strip disposed beneath said upper portion and a potentiometer slider extending from said upper portion to said resistance strip.

2. In the system of claim 1, said device further comprising a guide assembly positioned at a given end of said housing, said joystick means further comprising a shaft having a first end connected to said guide assembly and a second end, said knob being positioned on said second end of said shaft.

3. In the system of claim 1, said device comprising additional potentiometer means responsive to the position of said knob in the volume defined by said housing for generating at least one additional electrical signal corresponding thereto.

4. In the system of claim 3, wherein said additional potentiometer means comprises a first potentiometer for generating an additional electrical signal corresponding to the position of said knob relative to a first dimension and a second potentiometer for generating an additional electrical signal corresponding to the position of said knob relative to a second dimension.

5. In the system of claim 4, wherein said first and second potentiometers comprise respective angle potentiometers.

6. In the system of claim 3, wherein said additional potentiometer means generates first and second additional electrical signals corresponding to the position of said knob relative to first and second dimensions, respectively.

7. In the system of claim 1, said device further comprising bearing means disposed beneath said upper portion for facilitating movement of said upper portion relative to said base portion.

8. In the system of claim 1, wherein at any given time there is positional congruency between a position of said knob in the volume defined by said housing and a position of the cursor in the displayed three-dimensional volume.

9. In the system of claim 1, wherein at any given time there is directional congruency between movement of said knob in the volume defined by said housing and movement of the cursor in the displayed three-dimensional volume.

10. In a system for displaying a three-dimensional stereoscopic image of an object positioned in a displayed three-dimensional volume.

a cursor control device comprising a housing defining a volume corresponding to the displayed three-dimensional volume, said device further comprising joystick means operable by the user for moving and positioning a cursor in the displayed three-dimensional volume, wherein said joystick means includes a knob which is movable from one position to another within the volume defined by said housing;

said device further comprising a guide assembly positioned at a given end of said housing, said joystick means further comprising a shaft having a first end connected to said guide assembly and a second end, said knob being positioned on said second end of said shaft;

said guide assembly comprising potentiometer means responsive to the position of said knob in the volume defined by said housing for generating first and second electrical signals corresponding to the position of said knob relative to first and second dimensions, respectively, said device further comprising additional potentiometer means for generating a third electrical signal corresponding to the position of said knob relative to a third dimension;

said device further comprising a platform on which said guide assembly is mounted, said additional potentiometer means comprising a resistance strip disposed below said platform and a potentiometer slider extending from said platform to said resistance strip.

11. In the system of claim 10, said device further comprising bearing means disposed beneath said platform for permitting said platform to slide forward and backward along a line parallel to the third dimension.

12. In the system of claim 10, wherein at any given time there is positional congruency between a position of said knob in the volume defined by said housing and a position of the cursor in the displayed three-dimensional volume.

13. In the system of claim 10, wherein at any given time there is directional congruency between movement of said knob in the volume defined by said housing and movement of the cursor in the displayed three-dimensional volume.

* * * * *